US012643539B2

(12) United States Patent (10) Patent No.: US 12,643,539 B2
Fujita et al. (45) Date of Patent: Jun. 2, 2026

(54) OBSTACLE INFORMATION ACQUISITION SYSTEM TECHNICAL FIELD

(71) Applicant: AISIN CORPORATION, Kariya (JP)

(72) Inventors: Kunimitsu Fujita, Kariya (JP);
Toshinori Takeuchi, Kariya (JP);
Mitsuhiro Nimura, Kariya (JP)

(73) Assignee: AISIN CORPORATION, Kariya (JP)

( * ) Notice: Subject to any disclaimer, the term of this patent is extended or adjusted under 35 U.S.C. 154(b) by 286 days.

(21) Appl. No.: 18/030,013

(22) PCT Filed: Jul. 19, 2021

(86) PCT No.: PCT/JP2021/026924
§ 371 (c)(1),
(2) Date: Apr. 3, 2023

(87) PCT Pub. No.: WO2022/085258
PCT Pub. Date: Apr. 28, 2022

(65) Prior Publication Data
US 2023/0373475 A1    Nov. 23, 2023

(30) Foreign Application Priority Data
Oct. 22, 2020    (JP) ................................. 2020-177046

(51) Int. Cl.
*B60W 30/095*        (2012.01)
*B60W 30/18*         (2012.01)
*G06V 20/56*         (2022.01)

(52) U.S. Cl.
CPC .. *B60W 30/0956* (2013.01); *B60W 30/18163* (2013.01); *G06V 20/56* (2022.01); *B60W 2420/403* (2013.01); *B60W 2554/80* (2020.02)

(58) Field of Classification Search
CPC ....... B60W 30/0956; B60W 30/18163; B60W 2420/403; B60W 2554/80; G06V 20/56;
(Continued)

(56) References Cited

U.S. PATENT DOCUMENTS 7,259,660 B2 *    8/2007   Ewerhart ............... B60Q 9/007
                                                                    340/436
9,953,532 B2 *    4/2018   Tanaka .................. G01S 15/931
(Continued)

FOREIGN PATENT DOCUMENTS

CN          111231831 B  *  8/2021  ............... B60R 1/00
JP          2005-182753 A     7/2005
(Continued)

OTHER PUBLICATIONS

International Search Report for PCT/JP2021/026924 dated Sep. 7, 2021 (PCT/ISA/210).
(Continued)

*Primary Examiner* — Peter D Nolan
*Assistant Examiner* — Demetra R Smith-Stewart
(74) *Attorney, Agent, or Firm* — Sughrue Mion, PLLC

(57) ABSTRACT

There is provided a technique for acquiring information on an obstacle regardless of whether an operation of avoiding the obstacle has been performed. An obstacle information acquisition system includes an image obtaining part that obtains a shot image of a road on which a vehicle is traveling; an image recognizing part that detects an obstacle on a road and a lane from the image; and an obstacle information acquiring part that acquires obstacle information in which a location of the obstacle is associated with the image, based on a passable width of a lane where the obstacle is located in the image.

6 Claims, 9 Drawing Sheets

(58) Field of Classification Search
CPC ........ G08G 1/015; G08G 1/164; G08G 1/165;
G08G 1/166; G08G 1/167
See application file for complete search history.

(56) References Cited

U.S. PATENT DOCUMENTS

| | | | |
|---|---|---|---|
| 10,234,567 B2 * | 3/2019 | Kim | G01S 19/41 |
| 2010/0110193 A1 * | 5/2010 | Kobayashi | G06V 20/58 |
| | | | 348/149 |
| 2015/0210312 A1 * | 7/2015 | Stein | B60T 7/12 |
| | | | 701/41 |
| 2016/0339959 A1 * | 11/2016 | Lee | G06V 20/588 |
| 2019/0270447 A1 | 9/2019 | Tsuchiya et al. | |
| 2020/0172097 A1 | 6/2020 | Hasegawa et al. | |
| 2020/0247399 A1 | 8/2020 | Tanahashi et al. | |
| 2020/0279481 A1 * | 9/2020 | Kondo | G08G 1/0969 |
| 2022/0097693 A1 | 3/2022 | Hasegawa et al. | |

FOREIGN PATENT DOCUMENTS

| | | | |
|---|---|---|---|
| JP | 2007-034684 A | 2/2007 |
| JP | 2008-143263 A | 6/2008 |
| JP | 2018-089990 A | 6/2018 |
| JP | 2019-171893 A | 10/2019 |
| JP | 2020-087309 A | 6/2020 |
| WO | 2018/179275 A1 | 10/2018 |

OTHER PUBLICATIONS

Extended European Office Action dated Feb. 22, 2024 in Application No. 21882399.5.

* cited by examiner

OBSTACLE INFORMATION ACQUISITION SYSTEM TECHNICAL FIELD

CROSS REFERENCE TO RELATED APPLICATIONS

This application is a National Stage of International Application No. PCT/JP2021/026924 filed Jul. 19, 2021, claiming priority based on Japanese Patent Application 2020-177046 filed Oct. 22, 2020, the entire contents of which are incorporated in their entirety.

TECHNICAL FIELD

The present disclosure relates to an obstacle information acquisition system.

BACKGROUND ART

Conventionally, it is known that a vehicle detects a falling object (obstacle) on a road. Patent Literature 1 describes that information indicating whether a vehicle has performed an operation of avoiding a falling object and location information of the falling object are transmitted from the vehicle to a server, and when the proportion of vehicles having performed an operation of avoiding the same falling object is greater than or equal to a predetermined value, the server notifies the following vehicles that the falling object should be avoided.

CITATIONS LIST

Patent Literature

Patent Literature 1: JP 2020-087309 A

SUMMARY OF THE DISCLOSURE

Technical Problems

However, in the conventional technique, it cannot be determined whether a falling object should be avoided in the following cases. For example, there are a case in which a vehicle has passed by a falling object at very close range from the falling object (passed by performing a slight steering operation) and a case in which a vehicle is traveling in a lane adjacent to a lane where a falling object is present (an avoidance operation is not performed).

The present disclosure is made in view of the above-described problem, and provides a technique in which information on an obstacle can be acquired regardless of whether an operation of avoiding the obstacle has been performed.

Solutions to Problems

To provide the above-described technique, an obstacle information acquisition system includes an image obtaining part that obtains a shot image of a road on which a vehicle is traveling; an image recognizing part that detects an obstacle on a road and a lane from the image; and an obstacle information acquiring part that acquires obstacle information in which a location of the obstacle is associated with the image, based on a passable width of a lane where the obstacle is located in the image.

Namely, the obstacle information acquisition system identifies a passable width of a lane where an obstacle is located from an image, and acquires obstacle information in which the location of the obstacle is associated with the image, based on the passable width of the lane. Thus, according to the obstacle information acquisition system, obstacle information can be acquired regardless of whether an avoidance operation has been actually performed.

DESCRIPTION OF EMBODIMENTS

Here, embodiments of the present disclosure will be described in accordance with the following order:
   (1) First embodiment;
      (1-1) Configuration of an obstacle information acquisition system;
      (1-2) Obstacle information acquisition process;
   (2) Second embodiment;
   (3) Third embodiment; and
   (4) Other embodiments.

Figure 1:
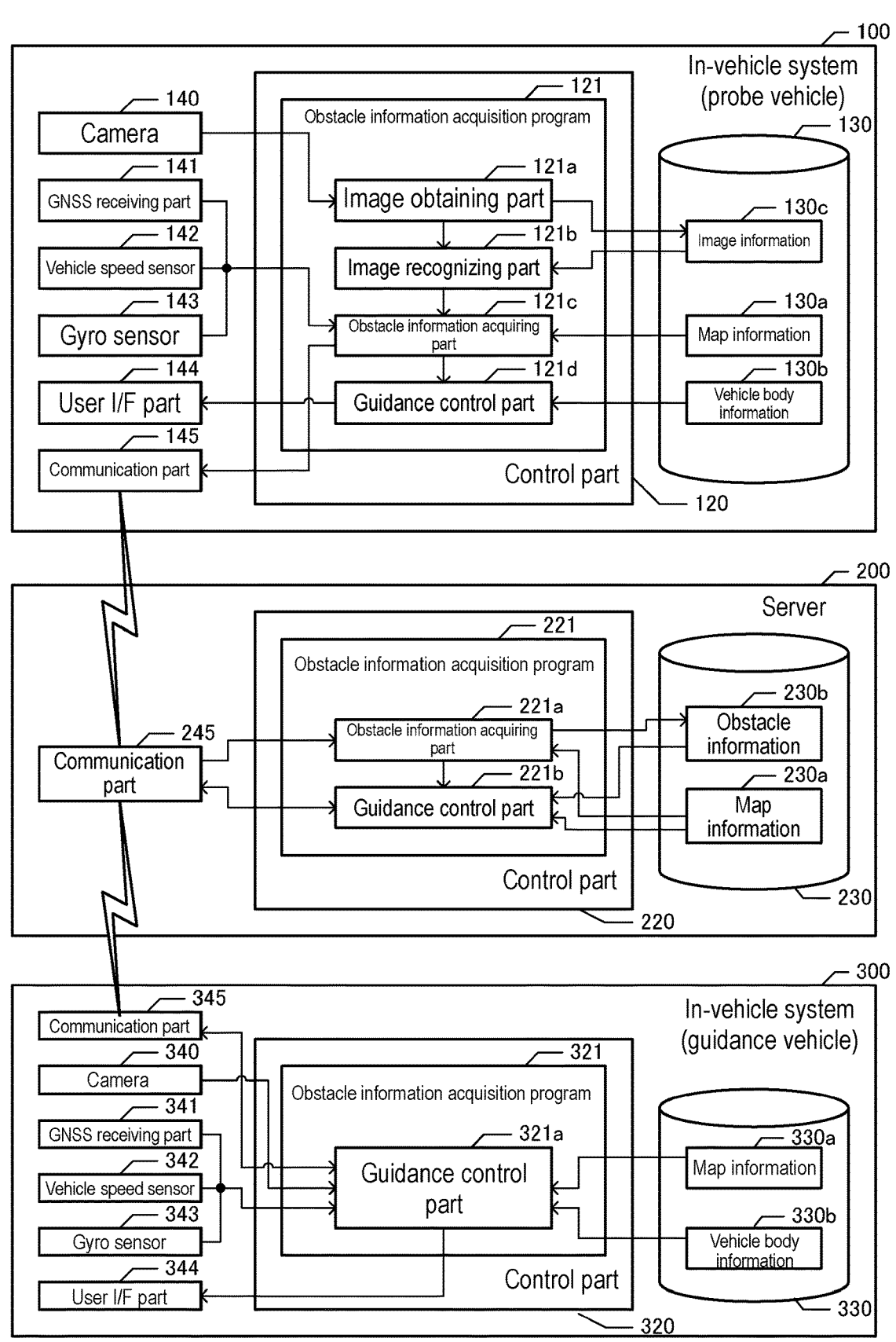
FIG. 1 is a block diagram showing a configuration of an obstacle information acquisition system.

(1) First Embodiment (1-1) Configuration of an Obstacle Information Acquisition System FIG. 1 is a block diagram showing a configuration of an obstacle information acquisition system according to the present disclosure. In the present embodiment, the obstacle information acquisition system includes an in-vehicle system 100, a server 200, and an in-vehicle system 300. The in-vehicle system 100 is provided in a vehicle that functions as a probe vehicle in the present embodiment, and has a function of shooting an image of an area around the vehicle and transmitting the image to the server 200. The in-vehicle system 300 is provided in a vehicle (guidance vehicle) that provides guidance based on information delivered from the server 200.

The in-vehicle system 100 includes a control part 120, a recording medium 130, a camera 140, a GNSS receiving part 141, a vehicle speed sensor 142, a gyro sensor 143, a user I/F part 144, and a communication part 145. The control part 120 is a computer including a CPU, a RAM, a ROM, etc. The in-vehicle system 100 can execute programs stored in the recording medium 130 and the ROM in the control part 120. The recording medium 130 has map information 130a and vehicle body information 130b recorded therein in advance. In addition, the recording medium 130 records image information 130c including an image shot in the course of traveling and information associated with the image.

The map information 130a is information used, for example, to identify a current location of the probe vehicle or provide route guidance, and includes, for example, node data representing the location, etc., of a node set on a road on which the probe vehicle travels, shape interpolation point data representing the location, etc., of a shape interpolation point for identifying the shape of a road between nodes, link data representing a link between nodes, and ground object data representing the location, shape, etc., of a ground object present on a road or around the road. Note that in the present embodiment, the node represents an intersection. In addition, link data is associated with information indicating the number and types of lanes present on a road section represented by the link data, and the widths of the lanes. In the present embodiment, a location indicated by a node or a shape interpolation point indicates the location of a centerline on a road section, and by the location, the number of lanes, and the widths of the lanes, the locations of the lanes and an area in which the lanes are present can be identified. The vehicle body information 130b is information on a vehicle body of the probe vehicle having the in-vehicle system 100 mounted thereon, and includes information indicating the dimensions of the vehicle body, such as the overall length, overall width, and height of the probe vehicle.

The GNSS receiving part 141 is a device that receives Global Navigation Satellite System signals, and receives radio waves from navigation satellites and outputs, through an interface which is not shown, a signal for calculating a current location of the probe vehicle. The control part 120 obtains the signal, thereby obtaining a current location (latitude, longitude, etc.) of the probe vehicle in a map coordinate system. The vehicle speed sensor 142 outputs a signal corresponding to the rotational speed of wheels provided on the probe vehicle. The control part 120 obtains the signal through an interface which is not shown, thereby obtaining vehicle speed. The gyro sensor 143 detects angular acceleration of the probe vehicle for a turn in a horizontal plane, and outputs a signal corresponding to the orientation of the probe vehicle. The control part 120 obtains the signal, thereby obtaining a traveling direction of the probe vehicle. The vehicle speed sensor 142, the gyro sensor 143, and the like, are used to identify a travel path of the probe vehicle, and in the present embodiment, a current location is identified based on the point of departure and travel path of the probe vehicle, and the current location of the probe vehicle identified based on the point of departure and the travel path is corrected based on an output signal from the GNSS receiving part 141.

The camera 140 is a device that obtains an image in a field of view oriented toward the front of the probe vehicle. An optical axis of the camera 140 is fixed on the probe vehicle, and the direction of the optical axis is to be known by the in-vehicle system 100. In the present embodiment, the camera 140 is mounted on the probe vehicle in a posture in which a vehicle width direction of the probe vehicle is perpendicular to optical axis center and an area ahead in a traveling direction of the probe vehicle is included in the field of view. The control part 120 obtains an image outputted from the camera 140 and analyzes the image by, for example, extracting features, thereby being able to detect an image of a detection target included in the shot image.

The user I/F part 144 is an interface part for accepting, as input, instructions from a user and providing various types of information to the user, and includes a touch panel type display, a speaker, etc., which are not shown. Namely, the user I/F part 144 includes an output part for images and audio; and an input part for instructions from the user. The output part of the user I/F part 144 can function as a guidance part that provides guidance on any information by an output from the output part (a user I/F part 344 which will be described later is also the same). The communication part 145 includes a circuit for performing radio communication with other devices. In the present embodiment, the control part 120 can give and receive various pieces of information to/from the server 200 by radio communication through the communication part 145.

The control part 120 can execute a navigation program (not shown) that displays a map including a current location or provides guidance on a route to a destination. In addition, when the control part 120 detects an obstacle present on a road from an image shot with the camera 140, the control part 120 can implement a function of acquiring obstacle information in which the location of the obstacle is associated with the image. The function can be implemented by an obstacle information acquisition program 121. To implement the function, the obstacle information acquisition program 121 includes an image obtaining part 121a, an image recognizing part 121b, and an obstacle information acquiring part 121c. A guidance control part 121d will be described in a third embodiment.

The image obtaining part 121a is a program module that allows the control part 120 to perform a function of obtaining a shot image of a road on which the probe vehicle is traveling. In the present embodiment, the control part 120 controls the camera 140 every certain period in the course of probe vehicle's travel, to shoot a view including a road ahead of the probe vehicle. An image outputted from the camera 140 by the shooting is recorded as image information 130c in the recording medium 130. Note that in the present embodiment, the control part 120 obtains a current location of the probe vehicle based on output signals from the GNSS receiving part 141, the vehicle speed sensor 142, and the gyro sensor 143, and records, as image information 130c, a current location of the probe vehicle obtained at the time of shooting an image and a shooting time in the recording medium 130 such that the current location and the shooting time are associated with each other. Note that the control part 120 obtains, by a map matching process, a road section on which the probe vehicle is traveling. Note also that the control part 120 can obtain a lane in which the probe vehicle is traveling, by detecting the location of a section line such as a lane boundary line, a centerline, or a roadway outer line by an image recognition process which will be described later.

The image recognizing part 121b is a program module that allows the control part 120 to implement a function of detecting an obstacle on a road and lanes from an image. The control part 120 detects a detection target by performing an image recognition process. In the present embodiment, the detection target includes a nearby vehicle (a passenger car, a truck, a bus, a motorcycle, etc.), a traffic sign, a traffic light, a structure (a utility pole, a guardrail, etc.) around a road, a pavement marking (characters, a crosswalk, a centerline, a lane boundary line, a roadway outer line, etc.), etc.

The control part 120 obtains image information 130c and performs lens distortion correction, etc. The control part 120 recognizes a line painted on a road, such as a roadway outer line, a lane boundary line, or a centerline, in an image having been subjected to the distortion correction. A section line recognition process may be performed by various techniques. For example, there is a process in which the control part 120 performs a straight-line detection process that uses Hough transform, etc., and when the color of a region sandwiched between detected straight lines is a predetermined color such as white and the width of the region is within a preset distance, the control part 120 recognizes the region as a line painted on a road, such as a lane boundary line, etc., or a centerline.

Figure 2A:
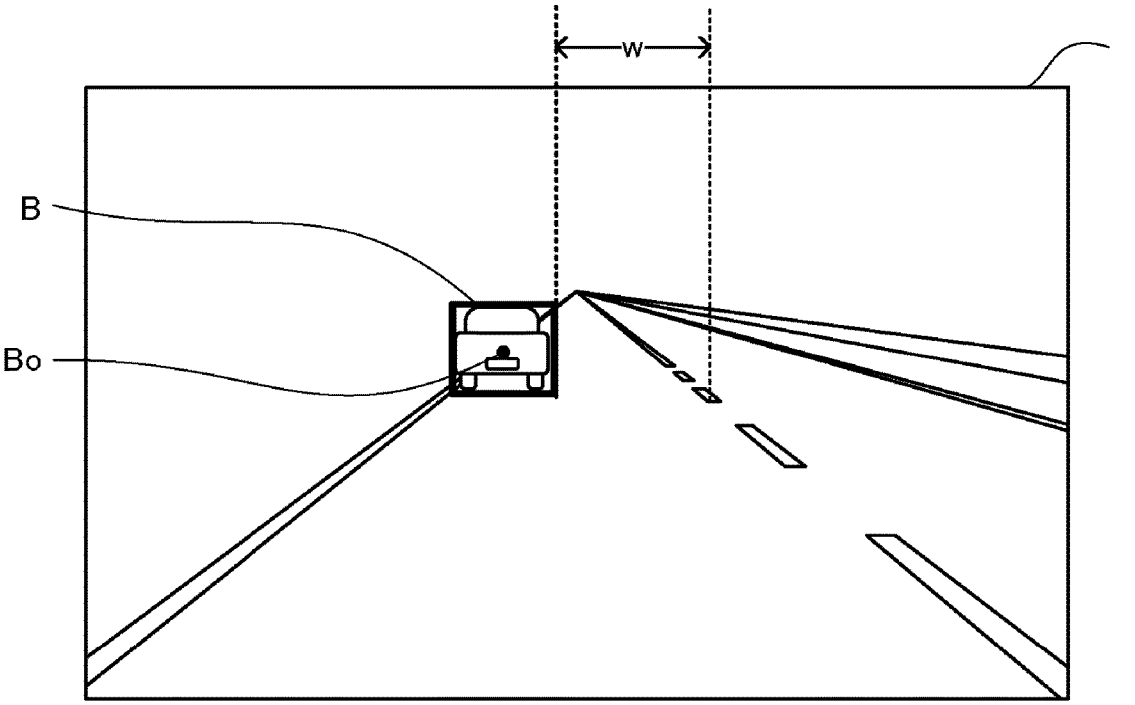
FIG. 2A is a diagram showing an example of a shot image and FIG. 2B is a diagram showing a plane including a vehicle width axis and a vehicle length axis.

Furthermore, the control part 120 performs an image recognition process for detecting the above-described detection target, using You Only Look Once (YOLO), pattern matching, etc. As a result of the image recognition process, the control part 120 detects an image of a detection target from a shot image. Note that the above-described section line recognition process may be performed using YOLO, pattern matching, etc. For example, when the control part 120 recognizes a nearby vehicle which is one of detection targets, the control part 120 identifies, in an image, a bounding box that encloses the nearby vehicle. The size and location of the bounding box indicate the size of an image of the nearby vehicle and the location of the nearby vehicle in the shot image. FIG. 2A is a diagram showing an example of an image I shot with the camera 140 and having been subjected to distortion correction. As shown in FIG. 2A, in the present embodiment, a bounding box B is a rectangular region that encloses a nearby vehicle detected in the image I.

The size and location of the bounding box B are represented by, for example, the coordinates of an upper left vertex and the coordinates of a lower right vertex of the bounding box B. The control part 120 obtains a height h (the number of pixels) of the bounding box B and representative coordinates Bo (x, y) of the bounding box B from the coordinates of the two diagonal vertices of the bounding box B. The representative coordinates Bo are, for example, the center coordinates of the bounding box B (the midpoint in a width direction and a height direction). The control part 120 identifies a relative orientation of the nearby vehicle as viewed from the probe vehicle, based on the location of the representative coordinates Bo of the bounding box B. In addition, the control part 120 identifies a distance from the probe vehicle to the nearby vehicle, based on the height h of the bounding box B and the type of the nearby vehicle.

Specifically, each set of coordinates in the image I is associated with a relative orientation of an object shown at the set of coordinates with respect to the probe vehicle, and information indicating a correspondence is stored in the recording medium 130. Based on the correspondence, the control part 120 obtains a relative orientation of the nearby vehicle shown at the representative coordinates Bo. In the present embodiment, a vehicle coordinate system with respect to the probe vehicle is defined. The vehicle coordinate system is a coordinate system defined by a vehicle width axis (an X-axis shown in FIG. 2B) and a vehicle length axis (a Y-axis shown in FIG. 2B) which are orthogonal to each other.

Figure 2B:
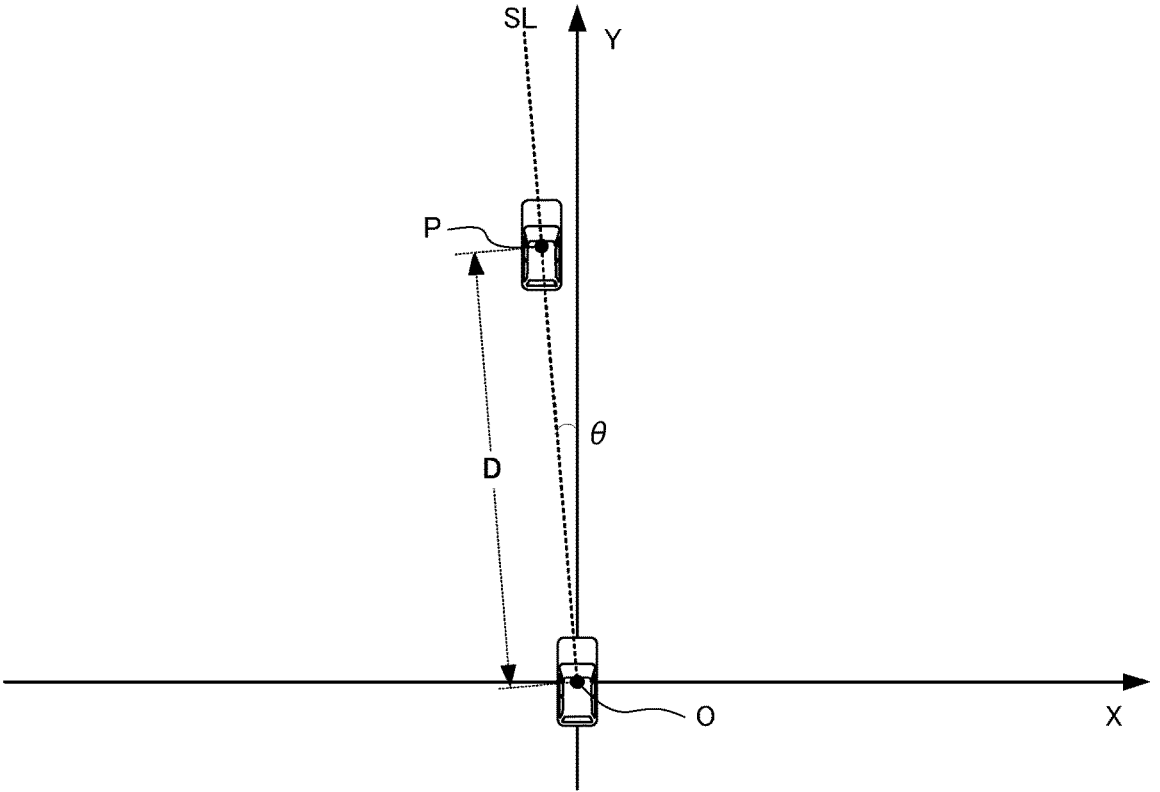

FIG. 2B shows a plane including the vehicle width axis and the vehicle length axis. In the drawing, the point O is the origin of the vehicle coordinate system of the probe vehicle. In an example of FIG. 2B, the vehicle length axis is parallel to a link indicating a road section on which the probe vehicle travels. A relative orientation is represented by, for example, an angle (θ) formed by a straight line SL that connects the origin O of the vehicle coordinate system to a point P corresponding to the representative coordinates Bo, and the vehicle length axis (e.g., when θ has a negative value, it indicates the left side of the vehicle length axis when facing ahead in a traveling direction, and when θ has a positive value, it indicates the right side).

Furthermore, the control part 120 identifies the type of the nearby vehicle in the bounding box B by an image recognition process. The nearby vehicle may be categorized into types: e.g., a bus, a truck, a passenger car, and a motorcycle. In addition, in the present embodiment, for each type of nearby vehicle, a representative vehicle height (e.g., 1.5 [m] for a passenger car) is defined. Furthermore, a straight-line distance between the probe vehicle and the nearby vehicle and a height h of the bounding box B obtained when the nearby vehicle is shot with the camera 140 are measured in advance. For each type of nearby vehicle, there is stored, in the recording medium 130, information indicating a correspondence between the height h of the bounding box B and the straight-line distance with respect to the origin of the vehicle coordinate system.

For example, when the height of a bounding box that encloses a passenger car whose representative actual measurement of vehicle height is 1.5 [m] is an h1 pixel, the h1 pixel is associated with the straight-line distance "D1 [m]", and when the height is an h2 pixel, the h2 pixel is associated with the straight-line distance "D2 [m]". For each of other types such as a bus, a truck, and a motorcycle, too, information indicating a correspondence is stored in the recording medium 130. Based on the correspondence, the control part 120 calculates a straight-line distance D (see FIG. 2B) associated with the height h of the bounding box B. In the above-described manner, based on an image shot with the camera 140, the control part 120 obtains a relative orientation θ of a nearby vehicle included in the image, and a straight-line distance D between the nearby vehicle and the probe vehicle.

In the present embodiment, an image is shot every shooting period of the camera 140, and for each image, a nearby vehicle is identified and a straight-line distance and a relative orientation are identified. Thus, the same nearby vehicle can be recognized in the course of shooting for several frames. Hence, in the present embodiment, while the same nearby vehicle is shot, the control part 120 provides the same identification information to the nearby vehicle. Hence, the control part 120 identifies a feature (e.g., color or a pattern in a bounding box B) of an image of each nearby vehicle whose relative orientation θ and straight-line distance D have been identified, and records, in the recording medium 130, identification information (e.g., a number) corresponding to the feature such that the identification information is associated with the relative orientation θ, the straight-line distance D, information indicating the feature of the nearby vehicle, and the shooting time of the image.

Every time an image is shot, the same identification information is provided to the same nearby vehicle, and thus, the control part 120 determines whether features of images associated with nearby vehicles that are recognized in an immediately preceding image and the most recent image match each other, by referring to the recording medium 130. When the features match each other, the control part 120 provides identification information provided to the nearby vehicle in the immediately preceding image also to the nearby vehicle recognized in the most recent image. As a result, the same identification information is provided to the nearby vehicles that are continuously shot with the camera 140. Needless to say, even if images with the same feature are shot in contiguous frames, the control part 120 may perform processes, e.g., when a distance between images of two nearby vehicles is greater than or equal to a threshold value, the control part 120 does not consider the vehicles to be identical. At any rate, during a period during which images provided with the same identification information are detected, it can be considered that the same nearby vehicle is continuously detected.

Subsequently, the control part 120 obtains a relative orientation θ, a straight-line distance D, and identification information corresponding to a feature, of each nearby vehicle recognized by performing an image recognition process. Namely, since the image recognition process is performed every time image information 130c is obtained, the control part 120 chronologically obtains, from results of image recognition processes performed on pieces of image information 130c shot during a preset period before the present time, relative orientations θ, straight-line distances D, and pieces of identification information corresponding to features that are obtained during the preset period.

In addition, the control part 120 obtains a current location (a current location obtained at the time of shooting image information 130c with the camera 140) and a traveling orientation (an orientation indicated by the vehicle length axis) of the probe vehicle that are associated with each piece of image information 130c for which a relative orientation θ and a straight-line distance D are calculated. Then, based on the relative orientation θ, the straight-line distance D, the current location of the probe vehicle, and the traveling orientation of the probe vehicle, the control part 120 obtains the location of a nearby vehicle in the map coordinate system. Namely, for each of nearby vehicles associated with the same identification information, a location in the map coordinate system is obtained.

Furthermore, the control part 120 identifies a road section and a lane where a nearby vehicle is located. Namely, the control part 120 identifies, based on node data and shape interpolation data for a road section on which the probe vehicle is traveling and a road section around the road section and the location of a nearby vehicle, a road section where the nearby vehicle is present, and identifies, based on node data and shape interpolation data for the road section, the location of a centerline on the road section. Furthermore, the control part 120 identifies the widths of lanes on the road section based on lane information of the road section, by referring to the map information 130a. Then, the control part 120 obtains a lane where the nearby vehicle is located, based on a distance between the centerline and the nearby vehicle. Note that a lane where the nearby vehicle is located may be identified based on the line types of section lines, which are detected from an image, at both edges in a width direction of a lane region where the nearby vehicle is located, and lane information obtained from the map information 130a.

When the amount of change in the location of a nearby vehicle having given identification information is less than or equal to a threshold value in pieces of image information 130c shot during the preset period before the present time, the control part 120 considers the nearby vehicle to be a stopped vehicle. In addition, in the present embodiment, a nearby vehicle being stopped due to a traffic jam is not considered to be an obstacle. Specifically, for example, when both the probe vehicle and a nearby vehicle oriented in the same traveling direction as a traveling direction of the probe vehicle are being stopped, the control part 120 does not consider the nearby vehicle being stopped to be an obstacle. On the other hand, when, while a nearby vehicle is being stopped at a specific location, the probe vehicle and other nearby vehicles oriented in the same traveling direction as a traveling direction of the probe vehicle are moving, the control part 120 considers the nearby vehicle being stopped to be an obstacle. In addition, for example, when a traveling direction of a lane where the nearby vehicle is located is the same as a traveling direction of the probe vehicle and it is determined that the probe vehicle has passed by the nearby vehicle but the nearby vehicle is continuously stopped, too, the control part 120 considers the nearby vehicle to be an obstacle.

Next, detection of an obstacle other than a vehicle will be described. The control part 120 identifies a region sandwiched between section lines in an image, as a road surface (lane) region. When there is a pavement marking other than section lines in the image, the control part 120 recognizes the pavement marking. Then, when the control part 120 has detected an object that is at least partially included in the road surface (lane) region and that is other than a pavement marking, the control part 120 obtains a relative location of the object with respect to the probe vehicle. For example, the control part 120 can obtain a straight-line distance and a relative orientation between the object and the probe vehicle from the coordinates in the image of, for example, a central portion of the object. The control part 120 identifies the location of the object in the map coordinate system, based on the current location and traveling orientation of the probe vehicle obtained at the time of image shooting, the straight-line distance, and the relative orientation. Locations of the same object are chronologically obtained from pieces of image information 130c shot during the preset period before the present time. When the amount of change in the location of the object is less than or equal to a threshold value, the control part 120 considers the object to be an obstacle.

The obstacle information acquiring part 121c is a program module that allows the control part 120 to implement a function of acquiring, based on a passable width of a lane where an obstacle is located in an image, obstacle information in which the location of the obstacle is associated with the image. In the present embodiment, a passable width of a lane where an obstacle is located is calculated based on an image, and when the passable width is less than or equal to a preset value, obstacle information is transmitted to the server 200. The passable width is the width of a portion of the lane that is not occupied by the obstacle out of the full width of the lane. The control part 120 identifies, from the location of the obstacle in the lane where the obstacle is located, a portion of the lane that is not occupied by the obstacle, and calculates the width in actual space of the portion. Specifically, for example, the control part 120 obtains the coordinates, in an image of an obstacle, of an edge portion in a horizontal direction of a bottom portion of the image, and calculates the coordinates of a point of intersection of a straight line extending in the horizontal direction from the edge portion in the image and a section line representing a boundary of a lane where the obstacle is located. The control part 120 obtains the length (the number of pixels) of a line segment that connects the edge portion to the point of intersection. The "w" in FIG. 2A indicates the line segment in an example of an image including an obstacle. In the image I, for each y-coordinate, a correspondence between the number of pixels in an x-direction and a distance in actual space is defined in advance, and the correspondence is recorded in the recording medium 130. The control part 120 can obtain an actual distance (passable width) between the edge portion of the obstacle and the section line representing the lane boundary from the y-coordinates of the edge portion and the point of intersection, the length (the number of pixels) of the line segment that connects the edge portion to the point of intersection, and the correspondence.

The control part 120 determines whether the passable width is less than or equal to a preset value. The preset value is a value for determining whether there is a possibility of traveling outside a lane where an obstacle is located, to avoid the obstacle. For example, it is possible to adopt, as the preset value, any of values ranging from the value of lane width itself to a value obtained by adding a preset margin to an assumable maximum vehicle width. When the passable width is less than or equal to the preset value, the control part 120 acquires obstacle information in which at least one image including a target obstacle among pieces of image information 130c is associated with the location of the obstacle, and transmits the obstacle information to the server 200. The location of the obstacle includes coordinates in the map coordinate system, a link ID indicating a road section where the obstacle is located, and identification information of a lane where the obstacle is located. Note that the obstacle information may also include the shooting date and time of the image and the location of the probe vehicle obtained at the time of shooting. When the passable width is greater than the preset value, in the present embodiment, the control part 120 does not transmit obstacle information to the server 200. Thus, in this case, in the present embodiment, a guidance vehicle does not provide guidance on the obstacle.

Note that in the present embodiment, when the type of an obstacle is a vehicle and the type of the vehicle obtained by performing image recognition process is a bus, the control part 120 does not calculate a passable width of a lane and does not transmit obstacle information to the server 200. Note that it may be configured such that when a determination is made as to whether a location at which a bus detected as an obstacle is stopped is a bus stop, and the location is a bus stop, obstacle information is not transmitted to the server 200. When the bus is stopped at a bus stop, the control part 120 considers the stop to be a temporary stop for getting on and off, and in the present embodiment, obstacle information about the bus is not transmitted to the server 200. As a result, an unnecessarily large number of pieces of obstacle information can be prevented from being transmitted to the server 200. Note that the location of a bus stop can be obtained based on the map information 130a, and by calculating the location of the bus based on the location and orientation (traveling orientation) of the probe vehicle and a shot image, and checking the location of the bus against the location of the bus stop, it can be determined whether the bus is stopped at the bus stop. Note that by detecting a sign, etc., included in an image and indicating a bus stop, it is also possible to determine that the location of the bus corresponds to the bus stop.

In addition, in the present embodiment, when the height of an obstacle is less than or equal to a reference height, the control part 120 does not transmit obstacle information about the obstacle to the server 200. When the height of an obstacle is less than or equal to the reference height (here, it is assumed that the obstacle is a thin, flat object such as a flattened cardboard box, a flattened plastic bag, or a crushed empty can), it is considered that the vehicle may be able to travel without avoiding the obstacle, and thus, obstacle information is not transmitted. As a result, an unnecessarily large number of pieces of obstacle information can be prevented from being transmitted to the server 200. Note that a correspondence between the coordinates of a bottom portion of an object in an image, the number of pixels of the object in a height direction (y-direction) of the image from the bottom portion, and the actual height of the object is recorded in advance in the recording medium 130, and the height of an obstacle can be obtained based on the coordinates of the obstacle in an image, the number of pixels of the obstacle in a height direction (y-direction) of the image, and the correspondence.

As described above, according to the present embodiment, when there is a possibility that a probe vehicle may travel veering off its lane to avoid an obstacle based on an image shot with the camera 140 included in the probe vehicle, obstacle information in which the location of the obstacle is associated with the image can be transmitted to the server 200. Hence, regardless of whether an avoidance operation has been actually performed, obstacle information can be acquired. For example, obstacle information can also be acquired from an image shot by a probe vehicle having passed through an obstacle by performing, for example, such a gentle steering operation that is not determined to be an avoidance operation, without performing an avoidance operation such as sudden steering, or by a probe vehicle that has not performed an avoidance operation because the probe vehicle travels in a lane other than a lane where the obstacle is located (e.g., a next lane or an oncoming lane).

Next, a configuration of the server 200 will be described. In the present embodiment, the server 200 has a function of delivering obstacle information to a guidance vehicle. There may be a single server 200 or there may be a plurality of servers 200. The server 200 includes a control part 220, a recording medium 230, and a communication part 240. The control part 220 is a computer including a CPU, a RAM, a ROM, etc. The control part 220 can execute an obstacle information acquisition program 221 stored in the recording medium 230 or the ROM.

The communication part 240 includes a circuit that performs communication with other devices. The control part 220 can perform radio communication with the in-vehicle systems 100 and 300, etc., through the communication part 240 by performing processes of the obstacle information acquisition program 221. The recording medium 230 has map information 230a recorded therein. The configuration of the map information 230a is common to that of the map information 130a.

In the present embodiment, when the obstacle information acquisition program 221 is executed, the control part 220 functions as an obstacle information acquiring part 221a and a guidance control part 221b. In the present embodiment, when the control part 220 receives, by a function of the obstacle information acquiring part 221a, obstacle information from the in-vehicle system 100 mounted on a vehicle that functions as a probe vehicle, the control part 220 saves the obstacle information in the recording medium 230 (obstacle information 230b). In addition, the control part 220 performs the above-described image recognition process on an image included in the obstacle information, thereby detecting an obstacle and calculating a passable width of a lane where the obstacle is located. When the control part 220 acquires pieces of obstacle information about an obstacle located at the same point from a plurality of probe vehicles, the control part 220 may, for example, calculate a passable width from each of images included in the respective pieces of obstacle information and calculate a statistical value of the passable width. In addition, since there is a possibility that the location of the obstacle may have changed, a passable width calculated at or earlier than a certain time ago from the current time may be excluded from the calculation of a statistical value.

The guidance control part 221b is a program module that allows the control part 220 to implement a function of providing guidance on an obstacle based on obstacle information. Note that in the present embodiment, a guidance control part is implemented by cooperation of the guidance control part 221b of the server 200 and a guidance control part 32a of a guidance vehicle. In the present embodiment, the guidance control part 221*b* of the server 200 has a function of identifying a vehicle located in a preset area including the location of an obstacle, delivering obstacle information to the vehicle, and allowing the vehicle to provide guidance based on the obstacle information. In the present embodiment, the preset area including the location of an obstacle may be assumed to be an area having a preset distance in all directions with the location of the obstacle being at the center thereof, an area whose radius is a preset distance, a mesh including the location of the obstacle, etc.

To implement this function, the control part 220 obtains vehicle location information transmitted from an in-vehicle system that can perform communication (an in-vehicle system mounted on a vehicle that can serve as a guidance vehicle), and saves the location of the vehicle that can serve as a guidance vehicle in the recording medium 230. The control part 220 sets a preset area including the location of an obstacle, based on obstacle information 230*b*, and identifies vehicles located in the preset area. Note that the identified vehicles may include a probe vehicle. Then, obstacle information is delivered to the identified vehicles. In the present embodiment, the obstacle information delivered from the server 200 includes the location of the obstacle, a road section and a lane where the obstacle is located, and a passable width (or a statistical value thereof). In the present embodiment, the obstacle information delivered from the server 200 may not include an image including the obstacle.

Next, a configuration of the in-vehicle system 300 mounted on a guidance vehicle will be described. The in-vehicle system 300 includes a control part 320, a recording medium 330, a camera 340, a GNSS receiving part 341, a vehicle speed sensor 342, a gyro sensor 343, a user I/F part 344, and a communication part 345. These components included in the in-vehicle system 300 have the same functions as the components 140 to 145 included in the in-vehicle system 100. In addition, the configuration of map information 330*a* recorded in the recording medium 330 is common to that of the map information 130*a*. Vehicle body information 330*b* is information on a vehicle body of the guidance vehicle having the in-vehicle system 300 mounted thereon, and includes information such as the overall length, overall width, and height of the guidance vehicle.

The control part 320 can execute a navigation program (not shown) that displays a map including a current location of the guidance vehicle or provides guidance on a route to a destination. In the present embodiment, the control part 320 can execute an obstacle information acquisition program 321 which is one of the functions of the navigation program. The obstacle information acquisition program 321 includes a guidance control part 321*a*. The guidance control part 321*a* is a program module that allows the control part 320 to implement a function of providing guidance based on obstacle information. The control part 320 obtains a current location of the guidance vehicle by a function of the guidance control part 321*a*. In addition, it is configured such that vehicle location information indicating a current location of the guidance vehicle is transmitted to the server 200 at preset timing. Furthermore, when the control part 320 acquires obstacle information from the server 200, the control part 320 identifies, from the obstacle information, the location of an obstacle and a road section and a lane where the obstacle is located. When the guidance vehicle is traveling on the road section and in the lane where the obstacle is located and has not yet passed through the location of the obstacle, the control part 320 determines whether a passing width of the guidance vehicle is greater than a passable width. Namely, the control part 320 obtains the overall width of the guidance vehicle by referring to the vehicle body information 330*b*, and calculates a passing width obtained by adding a width for a preset margin to the overall width.

When the passing width of the guidance vehicle is greater than the passable width which is received as the obstacle information, it is expected that the guidance vehicle veer off to a next lane to avoid the obstacle, and thus, the control part 320 provides lane change guidance to use, as a recommended lane, a lane other than a lane where the obstacle is located. When the passing width of the guidance vehicle is less than or equal to the passable width, it is determined that the guidance vehicle can avoid the obstacle without veering off to the next lane, and the control part 320 provides guidance for calling attention by providing notification of the presence of the obstacle. The passing width of a guidance vehicle varies depending on the overall width, etc., of the guidance vehicle, and thus, as in the present embodiment, by calculating, for each guidance vehicle, a passing width of the guidance vehicle and comparing the passing width with a passable width, lane change guidance can be provided to a guidance vehicle that requires a lane change.

The control part 320 displays an icon representing an obstacle at the location of the obstacle on a map displayed on a touch panel display of the user I/F part 344, thereby providing notification of the location of the obstacle. In addition, by calculating a distance K [m] along a road from the guidance vehicle to the obstacle, the presence of the obstacle K [m] ahead may be notified by voice. In addition, when lane change guidance is provided, the control part 320 provides notification of a lane where the obstacle is located and a recommended lane different than the lane among lanes on a road section on which the guidance vehicle is traveling, by displaying a lane list diagram, etc.

Note that the in-vehicle system 300 of the guidance vehicle may also have an equivalent function to that of the in-vehicle system 100 of the probe vehicle. Namely, it may be configured to transmit to the server 200 obstacle information in which an image shot by the guidance vehicle upon passing through the location of an obstacle indicated by obstacle information transmitted from the server 200 is associated with the location of the obstacle. By doing so, the server 200 can recognize, based on the image transmitted from the guidance vehicle, that the obstacle is still present on the road (the obstacle has not been removed from the road). In addition, since the number of accumulated shot images of the same object increases, the reliability of the statistical value of passable width calculated based on the images increases.

Note that it may be configured such that even if the control part 320 of the guidance vehicle analyzes an image that is shot with the camera 340 at a location a preset distance behind the location of the obstacle (such a distance that allows the location of the obstacle to be included in a field of view of the camera 340) and does not recognize the presence of the obstacle in the image, the image is transmitted to the server 200 such that the image is associated with the location of the guidance vehicle obtained at the time of shooting and the shooting date and time. By doing so, when the server 200 obtains the image, the shooting date and time, and the shooting location from the guidance vehicle, the server 200 performs an image recognition process on the image, and if the obstacle has been removed, then the server 200 can recognize that the obstacle is not included in the image. When it is recognized, based on one or more images, that an obstacle is not included in a shot image of a location where the obstacle has been present before, the control part

220 of the server 200 may determine that the obstacle has been removed from the road and terminate delivery of obstacle information about the obstacle thereafter.

Figure 3A:
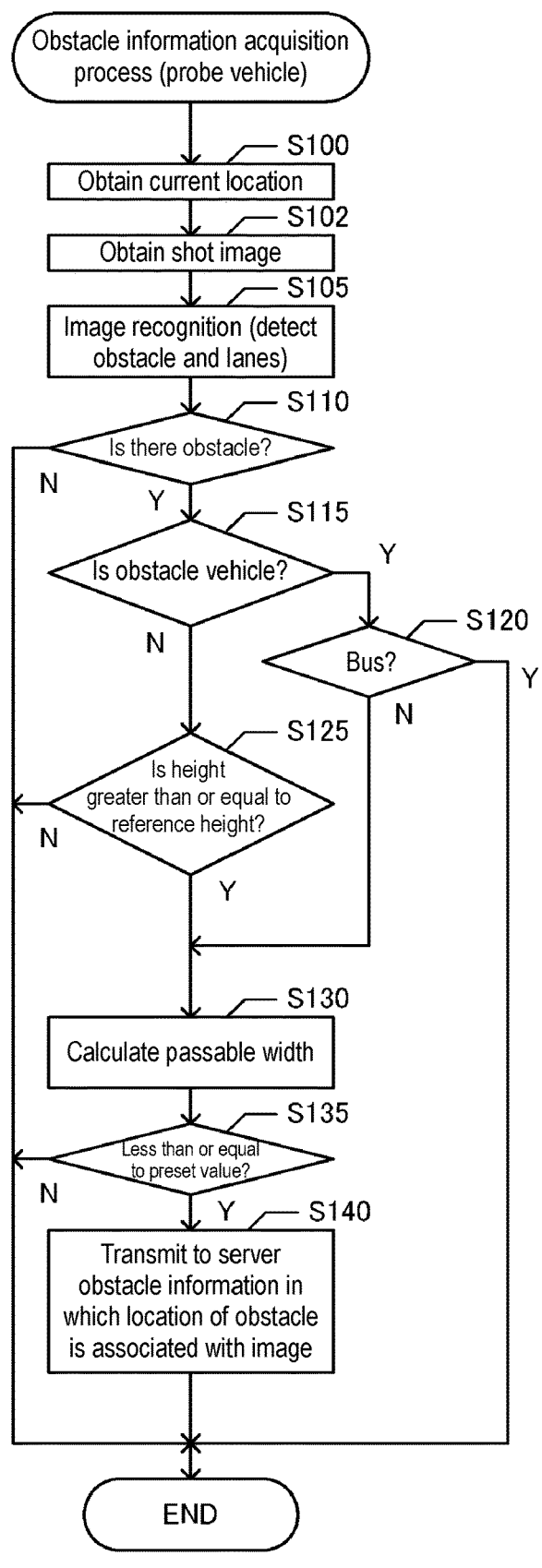
FIGS. 3A to 3C are flowcharts of an obstacle information acquisition process.

(1-2) Obstacle Information Acquisition Process:

Next, an obstacle information acquisition process performed by the control part 120 in the in-vehicle system 100 of a probe vehicle will be described with reference to FIG. 3A. The process of FIG. 3A is performed every lapse of a certain period of time. When the obstacle information acquisition process of FIG. 3A starts, the control part 120 obtains a current location of the probe vehicle (step S100). Namely, the control part 120 obtains a current location of the probe vehicle and a road section (link) on which the probe vehicle is traveling, by a map matching process that uses outputs from the GNSS receiving part 141, the vehicle speed sensor 142, and the gyro sensor 143 and the map information 130*a*. In addition, section lines included in an image shot with the camera 140 are detected to identify a lane in which the probe vehicle is traveling.

Subsequently, the control part 120 obtains a shot image by a process performed by the image obtaining part 121*a* (step S102). Namely, the control part 120 obtains an image shot with the camera 140. Subsequently, the control part 120 performs image recognition by a function of the image recognizing part 121*b* (step S105). Namely, the control part 120 performs an image recognition process for detecting a detection target, on the image obtained at step S102. Then, as described above, lanes and an obstacle are detected.

Subsequently, the control part 120 determines whether there is an obstacle, by a function of the image recognizing part 121*b* (step S110). Namely, the control part 120 determines whether an obstacle has been detected as a result of the image recognition process at step S105. If it is not determined at step S110 that there is an obstacle, then the control part 120 ends the obstacle information acquisition process. If it is determined at step S110 that there is an obstacle, then the control part 120 determines whether the obstacle is a vehicle, by a function of the image recognizing part 121*b* (step S115). Namely, the control part 120 determines whether a vehicle that is continuously stopped despite vehicles therearound traveling has been detected in the image.

If it is determined at step S115 that the obstacle is a vehicle, then the control part 120 determines whether the obstacle is a bus (step S120). Namely, the control part 120 determines whether the type of a nearby vehicle obtained by performing the image recognition process is a bus. If it is determined at step S120 that the obstacle is a bus, then the control part 120 ends the obstacle information acquisition process.

If it is not determined at step S115 that the obstacle is a vehicle, then the control part 120 determines whether the height of the obstacle other than a vehicle is greater than or equal to a reference height (step S125). Namely, the control part 120 calculates the height of the obstacle based on the number of pixels of the obstacle in a height direction of the image, the coordinates in the image of the obstacle, etc. If it is not determined at step S125 that the height is greater than or equal to the reference height, then the control part 120 ends the obstacle information acquisition process.

If it is not determined at step S120 that the obstacle is a bus, i.e., if the obstacle is a stopped vehicle other than a bus, e.g., a passenger car or a truck, then the control part 120 calculates a passable width by a function of the obstacle information acquiring part 121*c* (step S130). In addition, when it is determined at step S125 that the height is greater than or equal to the reference height, too, the control part

120 performs step S130. At step S130, the width of a portion of the lane that is not occupied by the obstacle out of the full width of the lane is calculated as a passable width.

After performing step S130, the control part 120 determines, by a function of the obstacle information acquiring part 121*c*, whether the passable width is less than or equal to a preset value (step S135). If the passable width is less than or equal to the preset value, then the control part 120 transmits to the server 200 obstacle information in which the location of the obstacle is associated with the image (step S140). In the present embodiment, the obstacle information includes at least one image including the obstacle; the location of the obstacle (coordinates in the map coordinate system, a link ID indicating a road section where the obstacle is located, and identification information of a lane where the obstacle is located); the shooting date and time of the image; the location of the probe vehicle at the time of shooting; etc. If it is not determined at step S135 that the passable width is less than or equal to the preset value, then the control part 120 ends the obstacle information acquisition process.

Figure 3B:
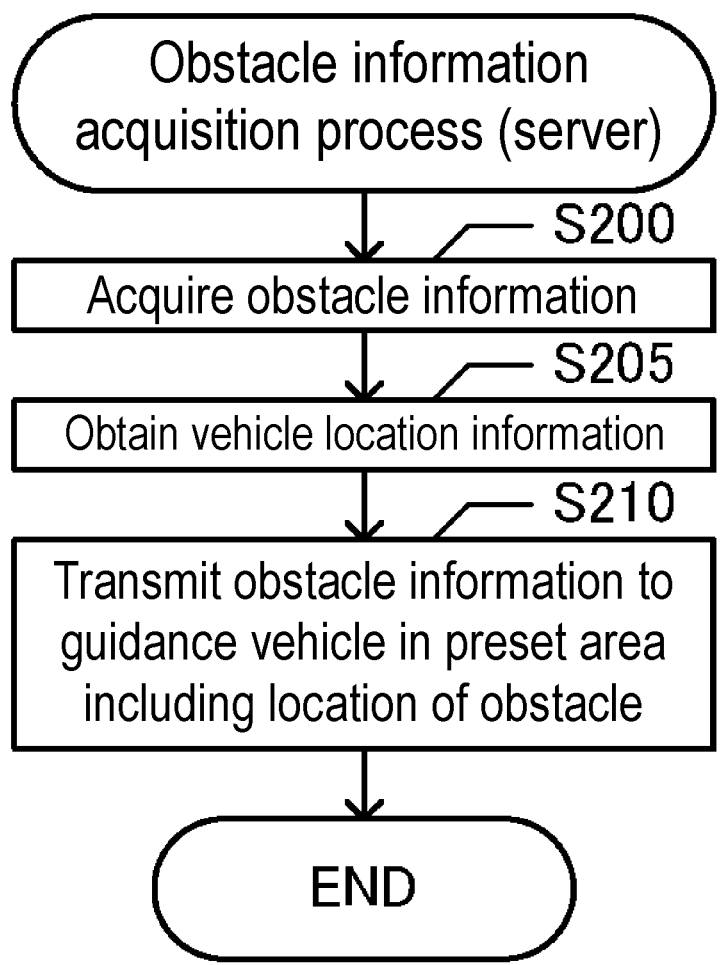

FIG. 3B is a flowchart of an obstacle information acquisition process performed by the server 200. The process of FIG. 3B is repeatedly performed every lapse of a certain period of time. When the process of FIG. 3B starts, the control part 220 acquires obstacle information by a function of the obstacle information acquiring part 221*a* (step S200). Namely, the control part 220 acquires obstacle information received from the in-vehicle system 100 of a probe vehicle and obtains a road section (link) where an obstacle is located, from the obstacle information.

Subsequently, the control part 220 obtains vehicle location information by a function of the guidance control part 221*b* (step S205). Namely, the control part 220 obtains pieces of vehicle location information transmitted from the in-vehicle systems 300 of guidance vehicles.

Subsequently, the control part 220 transmits obstacle information to a guidance vehicle in a preset area including the location of the obstacle (step S210). Namely, the control part 220 identifies a guidance vehicle located in the preset area including the location of the obstacle, based on the obstacle information acquired at step S200 and the vehicle location information obtained at step S205, and delivers obstacle information to the in-vehicle system 300 of the guidance vehicle.

Figure 3C:
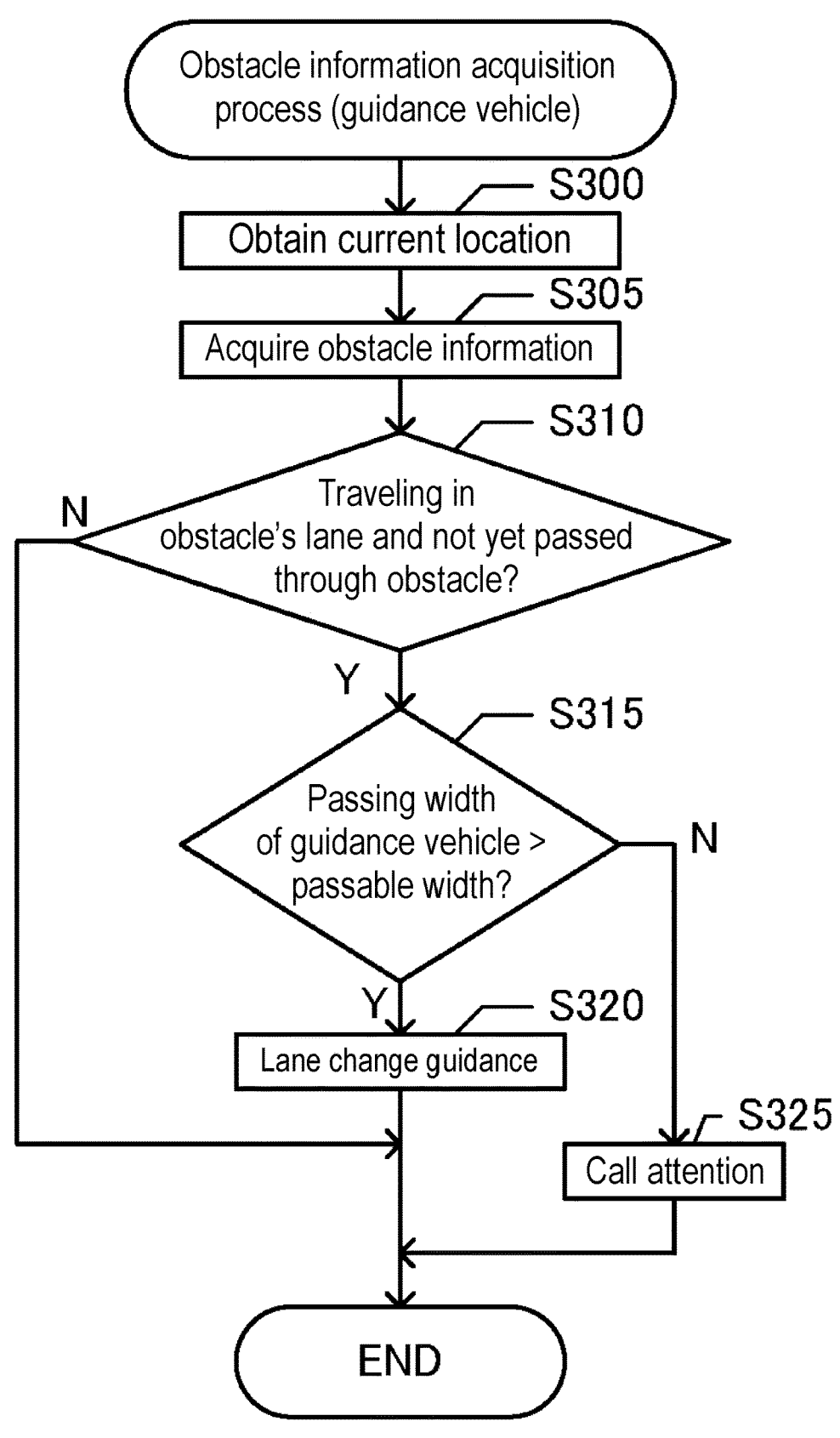

FIG. 3C is a flowchart of an obstacle information acquisition process performed by the in-vehicle system 300. The process shown in FIG. 3C is repeatedly performed every lapse of a certain period of time. When the obstacle information acquisition process shown in FIG. 3C starts, the control part 320 obtains a current location by a function of the guidance control part 321*a* (step S300). Namely, the control part 320 obtains a current location of the guidance vehicle and a road section (link) on which the guidance vehicle is traveling, by a map matching process that uses outputs from the GNSS receiving part 341, the vehicle speed sensor 342, and the gyro sensor 343 and the map information 330*a*. In addition, the control part 320 detects section lines included in an image shot with the camera 340 to identify a lane in which the guidance vehicle is traveling.

Subsequently, the control part 320 acquires obstacle information by a function of the guidance control part 321*a* (step S305). Namely, the control part 320 acquires obstacle information delivered from the server 200. The obstacle information includes a road section and a lane where an obstacle is located.

Subsequently, the control part 320 determines, by a function of the guidance control part 321*a*, whether the guidance vehicle is traveling on the road section and in the lane where the obstacle is located and has not yet passed through the obstacle (step S310). Namely, the control part 320 determines whether the guidance vehicle is traveling on the same road section as the obstacle and traveling in the same lane as a lane where the obstacle is located. When both the road section and the lane are the same as those of the obstacle, the control part 320 determines whether the guidance vehicle has not yet passed through the obstacle or has already passed through the obstacle, based on the current location of the guidance vehicle, the location of the obstacle, the shape of the road section, and a traveling direction of the lane.

If it is not determined at step S310 that the guidance vehicle is traveling on the road section and in the lane where the obstacle is located and has not yet passed through the obstacle, then the control part 320 ends the process of FIG. 3C. If it is determined at step S310 that the guidance vehicle is traveling on the road section and in the lane where the obstacle is located and has not yet passed through the obstacle, then the control part 320 determines, by a function of the guidance control part 321*a*, whether a passing width of the guidance vehicle is greater than a passable width (step S315). Namely, the control part 320 obtains a passing width of the guidance vehicle based on the vehicle body information 330*b*, and compares the passing width with a passable width obtained from the server 200. If it is determined at step S315 that the passing width of the guidance vehicle is greater than the passable width, then the control part 320 provides lane change guidance by a function of the guidance control part 321*a* (step S320). If it is not determined at step S315 that the passing width of the guidance vehicle is greater than the passable width, then the control part 320 provides attention-calling guidance by a function of the guidance control part 321*a* (step S325). Note that the guidance at step S320 and S325 may be provided regardless of whether guidance on a route to a destination is being provided.

(2) Second Embodiment

A second embodiment differs from the first embodiment in content of obstacle information to be transmitted to the server 200 based on a passable width, which will be specifically described with reference to FIG. 3A. After calculating a passable width based on an image at step S130, it is determined whether the passable width is less than or equal to the preset value, and if the passable width is not less than or equal to the preset value (step S135: N), then obstacle information that includes the location of an obstacle but does not include the image is transmitted to the server 200. If the passable width is less than or equal to the preset value (step S135: Y), then as in the first embodiment, obstacle information in which the location of the obstacle is associated with the image is transmitted to the server 200 (step S140). In this case, as the preset value, for example, a value obtained by adding a preset margin to an assumable maximum vehicle width can be adopted. Namely, when it is determined that even a vehicle with the largest overall width can pass without veering off its lane, the location of the obstacle is uploaded to the server 200, but an image including the obstacle is not uploaded to the server 200 (obstacle information in this case does not include the image but includes the location of the obstacle). As such, in the case of the present embodiment, for such an obstacle that does not greatly affect passing of many vehicles, an image is not transmitted, and thus, an unnecessarily large number of images can be prevented from being transmitted to the server 200.

Figure 4A:
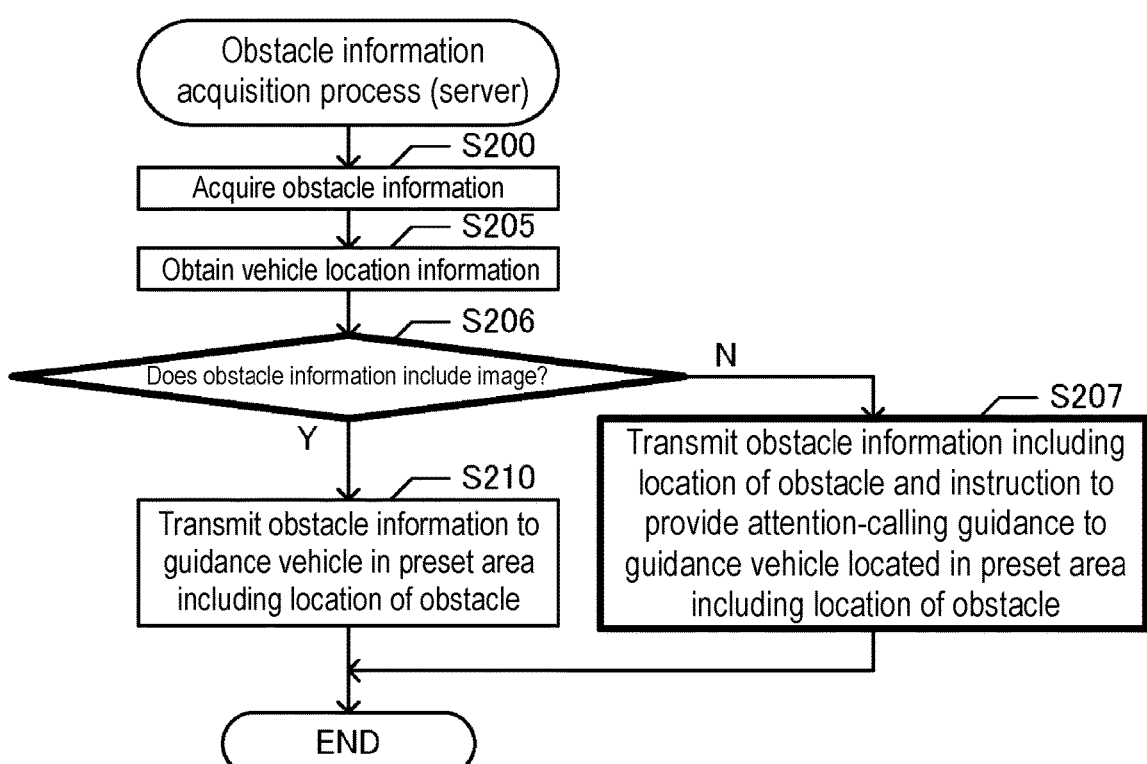
FIGS. 4A and 4B are flowcharts of an obstacle information acquisition process according to a second embodiment.
Figure 4B:
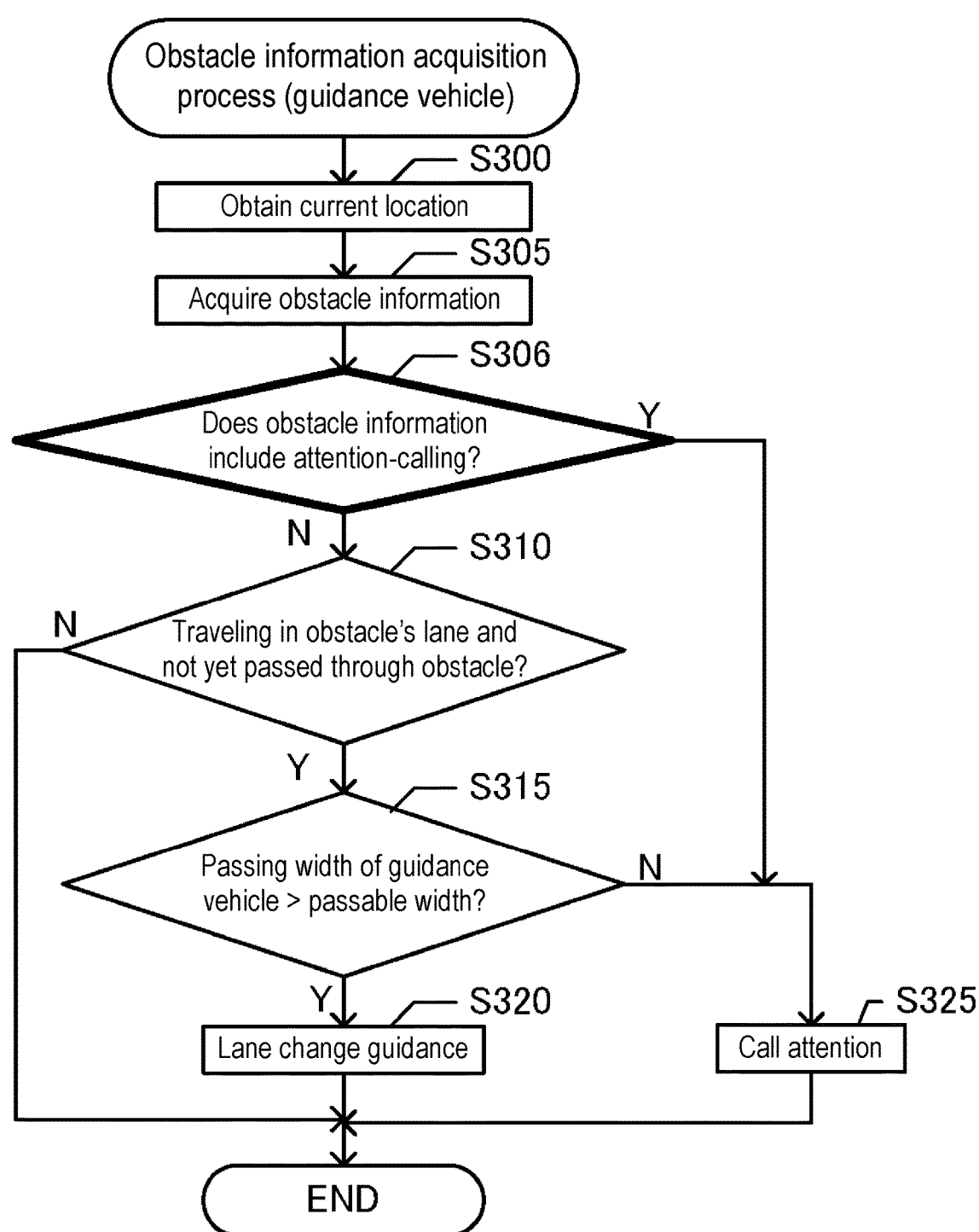

FIG. 4A is a flowchart of an obstacle information acquisition process performed by the server 200 of the second embodiment, and FIG. 4B is a flowchart of an obstacle information acquisition process performed by the in-vehicle system 300 of a guidance vehicle of the second embodiment. In FIGS. 4A and 4B, processing steps different from the first embodiment are shown in bold-line boxes. If the server 200 receives obstacle information that includes the location of an obstacle but does not include an image (determined to be N at step S206 of FIG. 4A), then the control part 220 transmits obstacle information including the location of the obstacle and an instruction to provide attention-calling guidance to a guidance vehicle located in a preset area including the location of the obstacle (step S207). In the in-vehicle system 300, if obstacle information received from the server 200 includes an instruction to provide attention-calling guidance (determined to be Y at step S306 of FIG. 4B), then the in-vehicle system 300 provides attention-calling guidance by providing notification of the location of an obstacle before reaching the location of the obstacle (step S325).

On the other hand, if the server 200 receives obstacle information in which the location of an obstacle is associated with an image (determined to be Y at step S206 of FIG. 4A), then as in the first embodiment, the control part 220 performs an image recognition process on the received image, thereby calculating a passable width, and transmits obstacle information including the location of the obstacle and the passable width to the in-vehicle system 300 (step S210). In the in-vehicle system 300, if obstacle information received from the server 200 does not include an instruction to provide attention-calling guidance (determined to be N at step S306 of FIG. 4B), then as in the first embodiment, the in-vehicle system 300 performs processes at and after step S310.

(3) Third Embodiment

Figure 5:
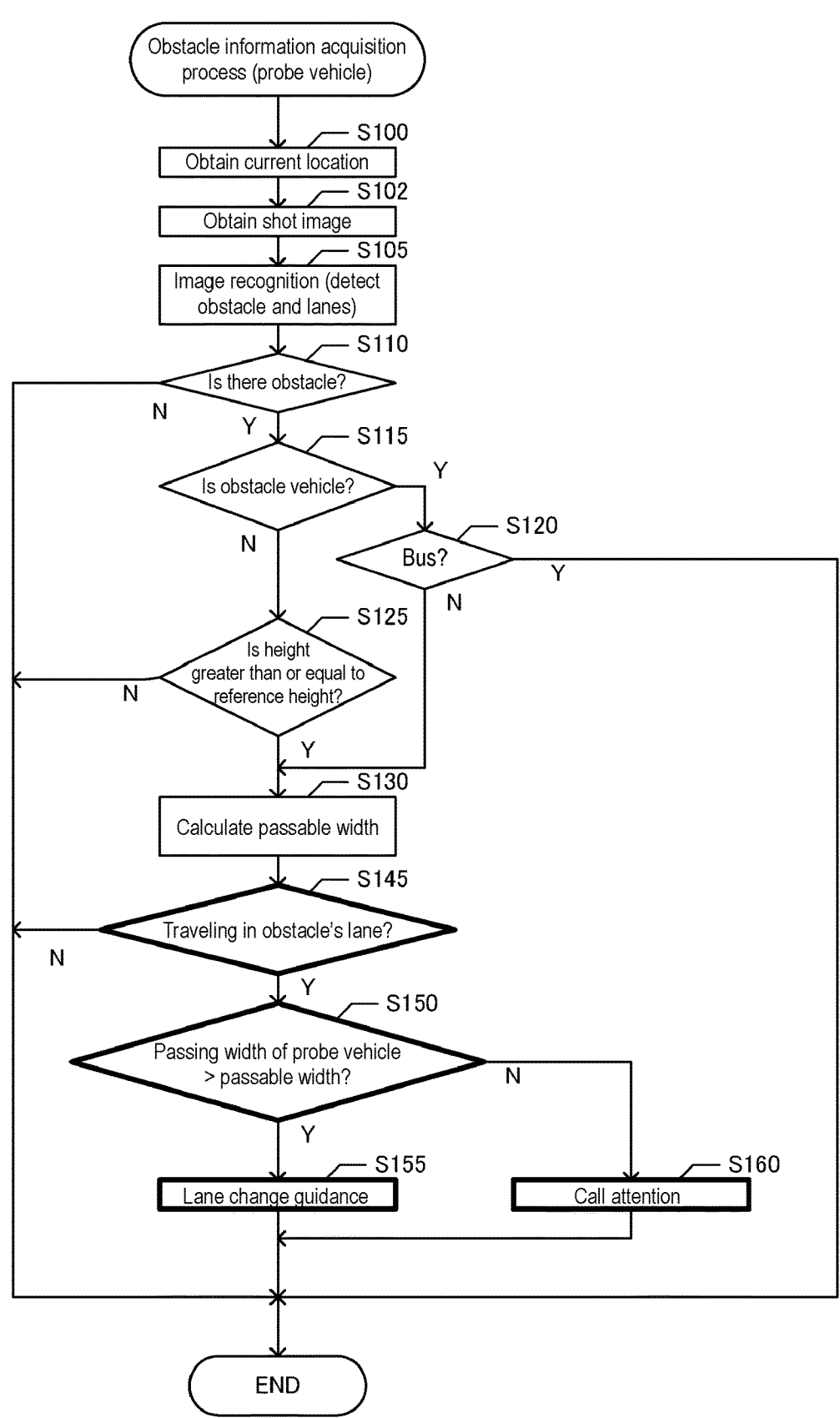
FIG. 5 is a flowchart of an obstacle information acquisition process according to a third embodiment.

In a third embodiment, the control part 120 of the in-vehicle system 100 of a probe vehicle further includes a guidance control part 121*d* in addition to the image obtaining part 121*a*, the image recognizing part 121*b*, and the obstacle information acquiring part 121*c*. FIG. 5 is a flowchart of an obstacle information acquisition process performed by the probe vehicle according to the third embodiment. In FIG. 5, processing steps different from the first embodiment are shown in bold boxes. In the third embodiment, when the control part 120 of the in-vehicle system 100 recognizes the presence of an obstacle, guidance of which is to be provided, by performing an image recognition process on a shot image, the control part 120 calculates a passable width based on the image (step S130). Then, by a function of the guidance control part 121*d*, the control part 120 determines whether the probe vehicle is traveling in a lane where the obstacle is located (step S145). If it is not determined at step S145 that the probe vehicle is traveling in the obstacle's lane, then the control part 120 ends the obstacle information acquisition process. If it is determined at step S145 that the probe vehicle is traveling in the obstacle's lane, then by a function of the guidance control part 121*d*, the control part 120 determines whether a passing width of the probe vehicle is greater than the passable width (step S150). If the passing width of the probe vehicle is greater than the passable width (determined to be Y at step S150), then by a function of the guidance control part 121*d*, the control part 120 provides lane change guidance to use, as a recommended lane, a lane other than the lane where the obstacle is located (step S155). In addition, if the passing width of the probe vehicle is less than or equal to the passable width (determined to be N at step S150), then by a function of the guidance control part 121*d*, the control part 120 provides attention-calling guidance by providing notification of the location of the obstacle (step S160). Note that the passing width of the probe vehicle has a value obtained by adding a predetermined margin to overall width included in the vehicle body information 130*b*. According to the present embodiment, the probe vehicle having detected an obstacle can provide guidance for dealing with the obstacle, without through the server 200.

(4) Other Embodiments

The above-described embodiments are examples for implementing various aspects of the present disclosure, and various other embodiments can also be adopted. For example, the obstacle information acquisition system may be a device mounted on a vehicle, etc., or may be a device implemented by a portable terminal, or may be a system implemented by a plurality of devices (e.g., the control part 120 in the in-vehicle system 100 and a control part in the camera 140). In addition, the functions of the image recognizing part and the obstacle information acquiring part that are included in the obstacle information acquisition system may be implemented by a server. In addition, the functions of the image recognizing part and the obstacle information acquiring part may be implemented by an in-vehicle system of a guidance vehicle. The in-vehicle system 300 and the in-vehicle system 100 both can also serve as in-vehicle systems of probe vehicles or can also serve as in-vehicle systems of guidance vehicles. Some components of the above-described embodiments may be omitted, and the order of processes may be changed or omitted.

The image obtaining part may be configured in any manner as long as the image obtaining part can obtain a shot image of a road on which a probe vehicle is traveling. The camera mounted on the probe vehicle may be a camera whose field of view includes a road ahead of the probe vehicle, or may be a camera whose field of view includes a road behind or a road on the side. The camera is to be adjusted in advance so that the location of an object included in an image shot with the camera (a relative location with respect to the probe vehicle) can be identified. If a relative location with respect to the probe vehicle can be obtained, then an absolute location of an object can be obtained based on the relative location and an absolute location of the probe vehicle.

The image recognizing part may be configured in any manner as long as the image recognizing part can detect an obstacle on a road and lanes from an image, and may adopt any technique. For example, a determination as to whether an obstacle is included in a shot image may be made by checking the image against patterns of obstacles, or may be made using models that are machine trained using images of obstacles as labeled data. In addition, the image recognizing part may be configured in any manner as long as the image recognizing part can identify, based on an image, a lane where an obstacle is located among all lanes on a road section where the obstacle is located. Note that an obstacle and a section line representing a lane boundary may be detected by using both a camera and a detection device other than the camera (e.g., radar or LiDAR).

The obstacle information acquiring part may be configured in any manner as long as the obstacle information acquiring part can acquire obstacle information in which the location of an obstacle is associated with an image, based on a passable width of a lane where the obstacle is located in the image. The obstacle may be any thing that can obstruct a vehicle upon passing. The obstacle may be present on a road surface or may be, for example, a dip created in a road. In a case of a dip, when the size of the dip is smaller than a reference size or when the depth of the dip is shallower than a reference depth, the dip may be excluded from a target to be acquired as obstacle information.

The obstacle information may be any information in which at least an image including an obstacle and the location of the obstacle are associated with each other. The location of the obstacle may be coordinates that directly represent the location of the obstacle or may be information that indirectly indicates the location of the obstacle. In the latter case, for example, the obstacle information may be information in which the location and traveling orientation of the probe vehicle at the time of shooting an image including an obstacle are associated with the shot image.

An in-vehicle system that can communicate with a server may be configured to also transmit vehicle location information to the server such that the vehicle location information is associated with an ID of a vehicle having the in-vehicle system mounted thereon, and may be configured to further transmit vehicle body information such that the vehicle body information is associated with the ID of the vehicle. In that case, the server can identify a passing width of each vehicle based on vehicle body information of each vehicle, and can make a comparison in magnitude between a passable width and a passing width of a guidance vehicle. When a guidance vehicle whose passing width is greater than a passable width is traveling in a lane where an obstacle is located, notification may be provided to an in-vehicle system of the guidance vehicle to provide lane change guidance, and notification may be provided to an in-vehicle system of a guidance vehicle whose passing width is less than or equal to the passable width to provide attention-calling guidance. The in-vehicle systems of the guidance vehicles may be configured to provide guidance according to the notification.

In addition, although, in the above-described embodiments, obstacle information is delivered to guidance vehicles located in a present area including the location of an obstacle, delivery destinations may be further limited. For example, obstacle information may be transmitted to vehicles traveling on a road section where an obstacle is located, or may be transmitted, further narrowing down to vehicles traveling in a lane where the obstacle is located. In addition, when a route to a destination is already set and includes a road section where an obstacle is located, obstacle information may be transmitted to a corresponding vehicle.

Note that in the above-described embodiments, it is configured such that the probe vehicle calculates a passable width by performing an image recognition process and the server also calculates a passable width by performing an image recognition process on an image again, but when a passable width is calculated by the probe vehicle, the server may not perform an image recognition process again. Namely, obstacle information including a passable width obtained as a result of performing an image recognition process by the probe vehicle may be transmitted to the server, and the server may perform a process of the guidance control part by adopting the passable width transmitted from the probe vehicle. In addition, for example, a configuration may be adopted in which the server does not perform an image recognition process on an image, but the guidance vehicle performs an image recognition process on an image to obtain a passable width. In this case, obstacle information delivered from the server to the guidance vehicle includes the location of an obstacle and at least one image including the obstacle.

In addition, an image including an obstacle that is received by the server from the probe vehicle may be used in other processes than an image recognition process for calculating a passable width. For example, the server may perform an image recognition process to identify the type of an obstacle (a vehicle, a tire, a box, a bag, a dead animal, etc.). In addition, for example, images may be collected as labeled data for creating, by machine learning, a model for obtaining whether an obstacle is included in an image, a model for obtaining the type of an obstacle from an image including the obstacle, etc. In addition, for example, an image including an obstacle may be used to display an obstacle portion of the image in the guidance control part of the guidance vehicle.

In addition, although the above-described embodiments describe an example in which the number of obstacles included in an image is one, even when a plurality of obstacles are present in the same lane, obstacle information can be acquired based on a passable width. When a plurality of obstacles are present in the same lane, if a distance between the obstacles in a direction in which a road extends is less than a predetermined value and a distance between the obstacles in a width direction of the road is, for example, less than a predetermined value, then a passable width may be calculated considering the obstacles as a single obstacle.

The guidance control part may also provide attention-calling guidance to a second vehicle traveling in a second lane other than a first lane where an obstacle is located. Since there is a possibility that a first vehicle traveling in the first lane where the obstacle is located may suddenly veer off to a lane (e.g., the second lane) other than the first lane, attention-calling guidance may be provided. The second lane may be a lane whose traveling direction is the same as that of the first lane, or may be an oncoming lane (no median strip). The second lane may be a lane adjacent to the first lane, or the second lane and the first lane may be next to each other with one or more lanes present therebetween.

Note that not only when an obstacle is present on a road section having a plurality of lanes, but also when a road section has only a single lane, guidance for calling attention may be provided by providing notification of the location of the obstacle. It may be configured such that when a passable width at the location of an obstacle is less than or equal to a passing width of a vehicle on a road section having only a single lane, the guidance control part provides guidance for avoiding the road section.

The guidance control part may be implemented by a server. Namely, the guidance control part 221*b* of the server identifies a guidance vehicle, selects content of guidance (lane change guidance, calling attention, etc.) to be provided to the guidance vehicle, and determines guidance timing (a point at which guidance is provided) in the guidance vehicle, and transmits information about the content of guidance and the guidance timing to the guidance target. The guidance vehicle may be configured to control the user I/F part 344 according to the information to provide guidance.

Figure 6:
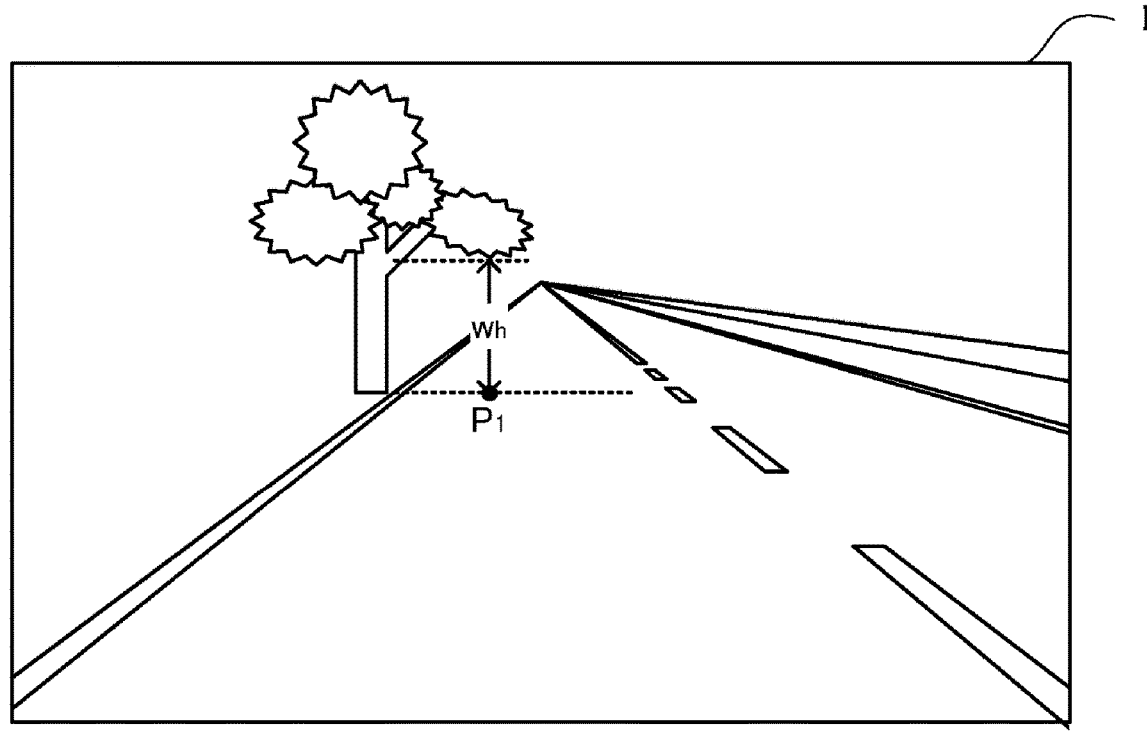
FIG. 6 is a diagram showing an example of a shot image.

The passable width may be the length of a portion, in a height direction from a road surface, of a lane where an obstacle is located that is not occupied by the obstacle. For example, FIG. 6 shows an example in which an obstacle is present on a road with space from a road surface. Such an obstacle may be assumed to be, for example, a branch of a tree, a sign, or a flown object hanging on a branch of a tree or a sign. FIG. 6 schematically shows an example in which one of branches of a tree on the side of a road overhangs the road. The image recognizing part detects lanes and an obstacle by performing an image recognition process such as YOLO, pattern matching, or contour detection. In a case of this example, the obstacle is branch and leaf portions overhanging the road. The image recognizing part obtains a relative orientation θ and a straight-line distance D, as viewed from the probe vehicle, with respect to a point $P_1$ obtained by vertically projecting a lower edge portion of the obstacle onto a road surface from above. Then, the image recognizing part obtains the location, in the map coordinate system, of the point $P_1$ of the obstacle, based on the relative orientation θ, the straight-line distance D, and the current location and traveling orientation of the probe vehicle. In addition, the obstacle information acquiring part acquires the length of a line segment $w_h$ having a lower edge of the obstacle and the point $P_1$ as its both ends. A correspondence between the length, in an image, of the line segment $w_h$ and the location, in the image, of a lower end ($P_1$) of the line segment $w_h$ and the length of the line segment $w_h$ in actual space is identified in advance, and using the correspondence, the image recognizing part obtains the length ($w_h$) in actual space between the lower edge portion of the obstacle and the road surface. The length ($w_h$) in actual space is the length of a portion, in a height direction from the road surface, of a lane where the obstacle is located that is not occupied by the obstacle (a passable width in the height direction). The guidance control part allows a guidance vehicle to acquire obstacle information including the location of the obstacle and the passable width in the height direction of the lane where the obstacle is located. The guidance vehicle compares a passing width in the height direction of the guidance vehicle (the overall height of the guidance vehicle is obtained from vehicle body information and a height for a preset margin is added to the overall height, by which a passing width in the height direction is obtained) with the passable width in the height direction, and provides guidance on the obstacle. For example, when the passing width in the height direction of the guidance vehicle is greater than the passable width in the height direction, lane change guidance is provided to use, as a recommended lane, a lane other than the lane where the obstacle is located. In addition, for example, when the passing width in the height direction of the guidance vehicle is less than or equal to the passable width in the height direction, attention-calling guidance that provides notification of the presence of the obstacle is provided. Note that the obstacle information may, of course, include both a passable width in a width direction of the lane and a passable width in the height direction, and a comparison between a passing width in an overall width direction of the guidance vehicle and the passable width in the width direction and a comparison between a passing width in the height direction of the guidance vehicle and the passable width ($w_h$) in the height direction may be made, and guidance on an obstacle, content of which is based on results of the comparisons, may be provided.

Furthermore, a technique in which, as in the present disclosure, an obstacle on a road and lanes are detected from a shot image of a road on which a vehicle is traveling, and obstacle information in which the location of the obstacle is associated with the image is acquired based on a passable width of a lane where the obstacle is located in the image is also applicable as a program or a method. In addition, a system, a program, and a method such as those described above may be implemented as a single device or may be implemented by using a component shared with each part included in a vehicle, and include various modes. In addition, changes can be made as appropriate, e.g., a part is software and a part is hardware. Furthermore, aspects of the disclosure are also feasible as a recording medium for a program that controls the system. Needless to say, the recording medium for the program may be a magnetic recording medium or may be a semiconductor memory, and any recording medium to be developed in the future can also be considered exactly in the same manner.

REFERENCE SIGNS LIST

100: In-vehicle system, 120: Control part, 121: Obstacle information acquisition program, 121*a*: Image obtaining part, 121*b*: Image recognizing part, 121*c*: Obstacle information acquiring part, 121*d*: Guidance control part, 130: Recording medium, 130*a*: Map information, 130*b*: Vehicle body information, 130*c*: Image information, 140: Camera, 141: GNSS receiving part, 142: Vehicle speed sensor, 143: Gyro sensor, 144: User I/F part, 145: Communication part, 200: Server, 220: Control part, 221: Obstacle information acquisition program, 221*a*: Obstacle information acquiring part, 221*b*: Guidance control part, 230: Recording medium, 230*a*: Map information, 230*b*: Obstacle information, 240: Communication part, 300: In-vehicle system, 320: Control part, 321: Obstacle information acquisition program, 321*a*: Guidance control part, 330: Recording medium, 330*a*: Map information, 330*b*: Vehicle body information, 340: Camera, 341: GNSS receiving part, 342: Vehicle speed sensor, 343: Gyro sensor, 344: User I/F part, 345: Communication part, B: Bounding box, and Bo: Representative coordinates

The invention claimed is:

1. An obstacle information acquisition system comprising:
    an image obtaining part that obtains a shot image of a road on which a vehicle is traveling;
    an image recognizing part disposed on the vehicle that detects an obstacle on a road and a lane from the image;
    an obstacle information acquiring part that acquires obstacle information in which a location of the obstacle is associated with the image, based on a passable width of a lane where the obstacle is located in the image, and the obstacle information is not acquired when the passable width is greater than a preset value; and
    a guidance control part that allows a guidance part to provide guidance, based on the obstacle information, wherein
        the guidance control part allows a guidance vehicle that travels in the lane where the obstacle is located and that has not yet passed through the location of the obstacle to:
            acquire the obstacle information including the location of the obstacle on a road and information indicating the passable width of the lane where the obstacle is located; and
            provide guidance on the obstacle, based on the location of the obstacle and the passable width, wherein the guidance vehicle and the vehicle are different vehicles, and based on the position of the obstacle and the current position of the guidance vehicle, it is determined whether the guidance vehicle is traveling on the lane where the obstacle is located and whether the obstacle position has not yet been passed.

2. The obstacle information acquisition system according to claim 1, wherein
    the passable width is a width of a portion of the lane where the obstacle is located that is not occupied by the obstacle out of a full width of the lane, and
    when the passable width is less than or equal to a preset value, the obstacle information is acquired.

3. The obstacle information acquisition system according to claim 1, wherein when a height of the obstacle is less than or equal to a reference height, the obstacle information is not acquired.

4. An obstacle information acquisition system comprising:
    an image obtaining part that obtains a shot image of a road on which a vehicle is traveling;
    an image recognizing part disposed on the vehicle that detects an obstacle on a road and a lane from the image;
    an obstacle information acquiring part that acquires obstacle information in which a location of the obstacle is associated with the image, based on a passable width of a lane where the obstacle is located in the image, and the obstacle information is not acquired when the passable width is greater than a preset value; and
    a guidance control part that allows a guidance part to provide guidance, based on the obstacle information, wherein
        the guidance control part allows a guidance vehicle that travels in the lane where the obstacle is located and that has not yet passed through the location of the obstacle to:
            provide notification of presence of the obstacle; and
            provide lane change guidance to use, as a recommended lane, a lane other than the lane where the obstacle is located, when a passing width of the guidance vehicle is greater than the passable width,
    wherein the guidance vehicle and the vehicle are different vehicles, and based on the position of the obstacle and the current position of the guidance vehicle, it is determined whether the guidance vehicle is traveling on the lane where the obstacle is located and whether the obstacle position has not yet been passed.

5. The obstacle information acquisition system according to claim 4, wherein
    the passable width is a width of a portion of the lane where the obstacle is located that is not occupied by the obstacle out of a full width of the lane, and
    when the passable width is less than or equal to a preset value, the obstacle information is acquired.

6. The obstacle information acquisition system according to claim 4, wherein when a height of the obstacle is less than or equal to a reference height, the obstacle information is not acquired.

* * * * *